Sept. 1, 1925.

D. BAUGHMAN

HEADLIGHT SHIFTING APPARATUS

Filed Aug. 22, 1924

1,551,925

INVENTOR
David Baughman
By Jack Snyder
Attorney

Patented Sept. 1, 1925.

1,551,925

UNITED STATES PATENT OFFICE.

DAVID BAUGHMAN, OF PITTSBURGH, PENNSYLVANIA.

HEADLIGHT-SHIFTING APPARATUS.

Application filed August 22, 1924. Serial No. 733,530.

*To all whom it may concern:*

Be it known that I, DAVID BAUGHMAN, a citizen of the United States, residing at Pittsburgh, in the county of Allegheny and State of Pennsylvania, have invented certain new and useful Improvements in Headlight-Shifting Apparatus, of which the following is a specification.

This invention relates to a headlight shifting apparatus for motor vehicles, and the primary object thereof is to provide a device of the class stated, in a manner as hereinafter set forth, which is operably connected to the steering mechanism of the motor vehicle to automatically shift the vehicle headlights to correspond to the steering movement of the front wheels of the vehicle, under such conditions projecting the rays of light from the headlights in alignment with the front wheels of the vehicle, whereby the direct path of travel will be clearly visible to the operator of the vehicle at all times and consequently minimizing accidents attending motor vehicle operations at night.

Further objects of the invention are to provide a headlight shifting apparatus, which is simple in its construction and arrangement, strong, durable and efficient in its use, compact, which may be installed to any type of motor vehicle, and which is comparatively inexpensive to manufacture and install.

With the foregoing and other objects in view which will appear, as the description proceeds, the invention resides in the details of construction hereinafter described and claimed, it being understood that changes in the precise embodiment of the invention herein disclosed can be made within the scope of the claims hereunto appended without departing from the spirit of the invention.

In the drawing forming a portion of this specification and wherein like numerals of reference designate corresponding parts throughout the several views:—

Figure 1:
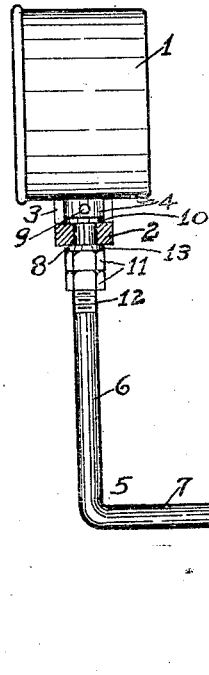
Figure 1 is a side view of a headlight shifting apparatus in accordance with my invention.
Figure 3:
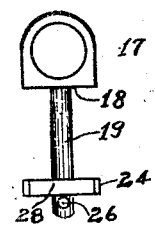
Figure 3 is an enlarged rear view of the compensating link and guide plate.
Figure 4:
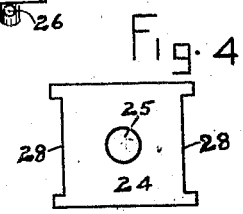
Figure 4 is a top plan view of the guide plate.
Figure 2:
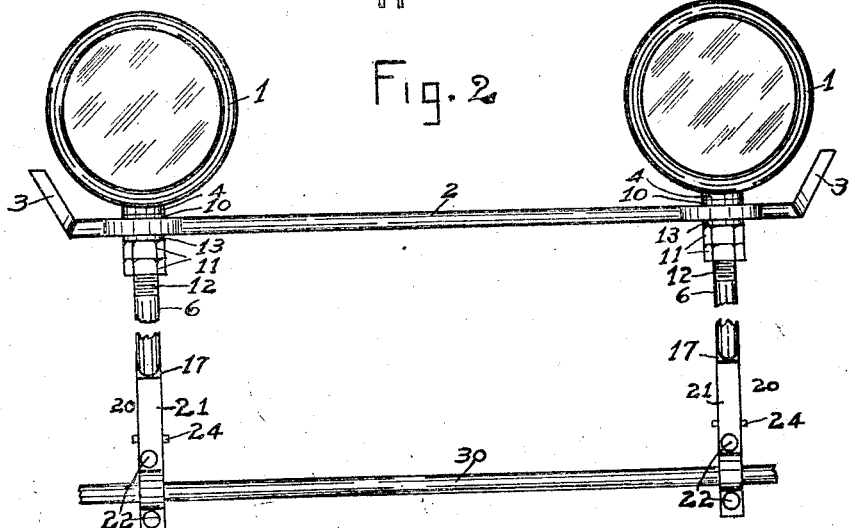
Figure 2 is a front view thereof.

Referring in detail to the drawing 1 denotes a motor vehicle headlight of the usual construction and mounted on a horizontally disposed supporting bar 2 which latter is provided with angularly disposed end portions 3 by which the supporting bar 2 is adapted to be rigidly secured to the mud guards or fenders of the motor vehicle.

The headlight 1 is formed on its lower end with a depending neck 4 and is shiftably mounted on the supporting bar 2 by means of the operating lever 5. The latter is substantially L-shaped consisting of a vertically disposed leg 6 and a rearwardly projecting horizontally disposed leg 7. The upper end of the vertical leg 6 extends through an aperture 8 in the supporting bar 2 and is fixed in the depending neck 4 of the headlight by a pin 9.

The vertical leg 6, of the operating lever 5, is rotatably mounted in the aperture 8 of the supporting bar 2, and a washer 10 is positioned between the lower face of the neck 4 and the upper face of the supporting bar 2. The vertical leg 6 is adjusted for rotation in the aperture 8 and is locked against vertical movement therein, by means of a pair of nuts 11, which engage the threaded portion 12 of the vertical leg 6. A washer 13 is interposed between the lower face of the supporting bar 2 and the nuts 11.

The horizontal leg 7 is formed with a reduced rear portion 14, having a threaded end 15 carrying a nut 16. A compensating link 17 is slidably mounted on the reduced portion 14 and is provided with a flat underface 18 and a depending stem 19 disposed centrally of the underface 18.

A vertically disposed actuating arm 20, consisting of a pair of spaced members 21 is fixedly secured to the parallel rod 20 which latter connects with steering knuckles of the motor vehicle. The free ends of the spaced members 21 engage respective sides of the parallel rod 30, and are securely clamped to the latter by means of the bolts 22, as clearly shown in Figure 1, of the drawing.

The upper ends of the spaced member 21 are joined together to provide a flat top 23 which abuts against the flat underface 18 of the link 17 during the operation of the apparatus. The top 23 is formed with a centrally disposed aperture for the reception of the link stem 18 which extends downwardly between the spaced members 21. The lower end of the link stem 18 carries a slidably mounted guide plate 24. The latter is formed with a centrally disposed aperture 25, through which the stem 18 extends. The lower end of the stem 18 is formed with an aperture 26, in which a cotter pin 27 is placed for maintaining the guide block 24 on the stem 18. The guide block 24 is provided with a pair of recesses 28 formed in opposed side edges thereof. The recesses 28 slidably engage respective side members 21 and serve to keep the stem 18 in vertical alignment during the operation of the device. A spiral spring 29 is mounted on the stem 18 intermediate of the guide plate 24 and the top 23 of the actuating arm 20, to provide a noiseless tensioned connection of the associated parts.

When installing the shifting apparatus to a vehicle, the relative position of the link 17 to the actuating arm 20 is such that about one-half of the stem 18 will normally project above the top 23, of the arm 20, thereby permitting of the vertical movement of the stem 18 in the arm 20, to compensate for the usual vibration of the vehicle during its operation.

The sliding connection of the link 17 on the reduced lever portion 16 and its pivotal connection with the actuating arm 20 and guide plate 24, will allow for the free shifting of the operating lever 5 in any direction without setting up any binding action of the associated parts.

What I claim is:

1. In combination with a headlight, supporting member therefor, and the parallel rod of the steering mechanism of a motor vehicle, an operating lever pivotally mounted in said supporting member and fixedly secured to said headlight, an actuating arm rigidly attached to said parallel rod, and a link including a stem slidably connected with said lever, said stem extending into said arm and resiliently connected therewith.

2. In combination, with a headlight, support therefor, and the parallel rod of the steering mechanism of a motor vehicle, a substantially L-shaped operating lever consisting of a vertical leg and a horizontal leg, the upper end of said vertical leg pivotally mounted in said support and fixedly connected to said headlight, said horizontal leg formed with a reduced portion at the rear end thereof, a vertically disposed actuating arm consisting of a pair of spaced arm members rigidly clamped at its lower end to said parallel rod, a link slidably mounted for horizontal movement on the said reduced portion of said horizontal leg, said link carrying a depending stem pivotally engaging the top of said arm and extending between said spaced arm members, a guide plate slidably mounted for vertical movement between said spaced arm members and rotatably supported on the lower end of said stem, and a resilient member mounted on said stem and interposed between the top of said actuating arm and the said guide plate, substantially as described and for the purpose set forth.

In testimony whereof I affix my signature.

DAVID BAUGHMAN.